(12) United States Patent
Leigh et al.

(10) Patent No.: US 10,741,963 B2
(45) Date of Patent: Aug. 11, 2020

(54) CABLE ASSEMBLY WITH CONJOINED ONE-LANE CABLE ASSEMBLIES

(71) Applicant: Hewlett Packard Enterprise Development LP, Houston, TX (US)

(72) Inventors: Kevin B. Leigh, Houston, TX (US); John Norton, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 67 days.

(21) Appl. No.: 15/550,865

(22) PCT Filed: Feb. 27, 2015

(86) PCT No.: PCT/US2015/017964
§ 371 (c)(1),
(2) Date: Aug. 14, 2017

(87) PCT Pub. No.: WO2016/137485
PCT Pub. Date: Sep. 1, 2016

(65) Prior Publication Data
US 2018/0034192 A1    Feb. 1, 2018

(51) Int. Cl.
*H01R 13/514* (2006.01)
*G02B 6/38* (2006.01)
(Continued)

(52) U.S. Cl.
CPC ......... *H01R 13/514* (2013.01); *G02B 6/3879* (2013.01); *H01R 13/5804* (2013.01);
(Continued)

(58) Field of Classification Search
CPC .. G02B 6/3879; G02B 6/3895; G02B 6/4292; H01R 13/5804; H01R 13/6691
See application file for complete search history.

(56) References Cited

U.S. PATENT DOCUMENTS 3,521,332 A  *  7/1970  Kramer ................... F16B 2/22
                                                     248/229.26
4,386,752 A  *  6/1983  Pavlak .................... F16L 3/127
                                                     24/543
(Continued)

FOREIGN PATENT DOCUMENTS

CN      101789575         7/2010
CN      102210065 A      10/2011
(Continued)

OTHER PUBLICATIONS

Accessories for Retaining Helawrap Open Cable Cover HWCLIP08; 3 pages; Retrieved from Internet Sep. 1, 2015, <http://www.hellermanntyton.co.uk/site/products/protective-tubing-and-spiral-binding/hwclip08/161-64002>.
(Continued)

*Primary Examiner* — Peter Radkowski
(74) *Attorney, Agent, or Firm* — Nolte Intellectual Property Law Group (57) ABSTRACT

One example of a cable assembly includes a plurality of 1-lane cable assemblies and latching features to couple the cable assembly to a receptacle. Each 1-lane cable assembly generally includes a cable and a cable connector attached to at least one end of the cable. As an example, each cable connector of a 1-lane cable assembly includes interlocking geometries to conjoin with interlocking geometries of cable connectors of other 1-lane cable assemblies. As an example, the cable assembly includes pins insertable through the interlocking geometries, wherein the pins are to secure the conjoined 1-lane cable assemblies to each other.

20 Claims, 8 Drawing Sheets

(51) Int. Cl.
*H01R 13/58* (2006.01)
*H01R 13/633* (2006.01)
*H01R 31/06* (2006.01)
*H01R 13/627* (2006.01)
*G02B 6/42* (2006.01)
*H01R 13/66* (2006.01)

(52) U.S. Cl.
CPC .......... *G02B 6/3895* (2013.01); *G02B 6/4292* (2013.01); *H01R 13/6275* (2013.01); *H01R 13/6335* (2013.01); *H01R 13/6691* (2013.01); *H01R 31/06* (2013.01)

(56) References Cited

U.S. PATENT DOCUMENTS

| | | | | |
|---|---|---|---|---|
| 4,767,338 | A * | 8/1988 | Dennis | H01R 31/06 439/455 |
| 4,797,123 | A * | 1/1989 | Weber | H01R 12/7088 439/717 |
| 5,263,671 | A * | 11/1993 | Baum | B62J 11/00 24/543 |
| 5,386,487 | A * | 1/1995 | Briggs | G02B 6/3879 385/59 |
| 5,559,590 | A | 9/1996 | Arai et al. | |
| 5,564,939 | A | 10/1996 | Maitani et al. | |
| 5,586,906 | A | 12/1996 | Staros et al. | |
| 5,669,590 | A * | 9/1997 | Przewodek | F16L 3/221 248/68.1 |
| 5,993,237 | A | 11/1999 | Kern, Jr. et al. | |
| 6,062,516 | A * | 5/2000 | Rizzo | F16L 3/13 248/316.7 |
| 6,175,080 | B1 | 1/2001 | Nightingale | |
| 6,216,410 | B1 * | 4/2001 | Haberman | E04B 1/02 403/381 |
| 6,219,479 | B1 * | 4/2001 | Madden | G02B 6/2808 385/46 |
| 6,364,721 | B2 * | 4/2002 | Stewart, III | H01R 11/09 174/187 |
| 6,378,811 | B1 * | 4/2002 | Potter | F16L 3/222 248/49 |
| 6,669,150 | B2 * | 12/2003 | Benoit | F16B 21/084 248/71 |
| 6,808,116 | B1 * | 10/2004 | Eslambolchi | G01S 13/825 235/375 |
| 6,887,091 | B1 | 5/2005 | Wu | |
| 6,926,237 | B2 * | 8/2005 | Shereyk | F16B 5/0685 248/71 |
| 7,044,802 | B2 | 5/2006 | Chiou et al. | |
| 7,055,784 | B2 * | 6/2006 | Stigler | B60R 16/0215 24/16 PB |
| 7,119,280 | B1 * | 10/2006 | Ray | H02G 3/0437 174/72 A |
| 7,134,908 | B2 | 11/2006 | Wu | |
| 7,241,163 | B1 | 7/2007 | Ray et al. | |
| 7,294,789 | B1 * | 11/2007 | Watthanasintham | B60R 16/0215 174/135 |
| 7,318,740 | B1 | 1/2008 | Henry et al. | |
| 7,494,353 | B2 | 2/2009 | Choi | |
| 7,494,363 | B1 | 2/2009 | Wu | |
| 7,605,707 | B2 * | 10/2009 | German | H01R 13/465 340/572.7 |
| 7,622,682 | B2 * | 11/2009 | Malin | H02G 3/32 174/135 |
| 7,648,392 | B2 | 1/2010 | Chambers et al. | |
| 7,654,831 | B1 | 2/2010 | Wu | |
| 7,661,979 | B2 | 2/2010 | Hughes | |
| 7,789,718 | B2 * | 9/2010 | Desard | H01R 4/36 439/276 |
| 7,841,889 | B2 | 11/2010 | Gerard et al. | |
| 7,845,859 | B2 | 12/2010 | Roth et al. | |
| 8,212,145 | B2 | 7/2012 | Nagai | |
| 8,340,123 | B2 | 12/2012 | Barbieri | |
| 8,370,704 | B2 | 2/2013 | Ganga et al. | |
| 8,475,197 | B2 | 7/2013 | Zerebilov et al. | |
| 8,506,176 | B2 | 8/2013 | Daikuhara et al. | |
| 8,585,426 | B2 | 11/2013 | Zerebilov | |
| 8,596,882 | B2 | 12/2013 | Smrha et al. | |
| 8,636,544 | B1 | 1/2014 | Briant | |
| 8,639,082 | B2 | 1/2014 | Haley | |
| 8,645,747 | B2 | 2/2014 | Buckland et al. | |
| 8,668,525 | B1 | 3/2014 | Tu et al. | |
| 8,770,990 | B2 | 7/2014 | Sytsma et al. | |
| 8,867,883 | B2 * | 10/2014 | Crain | G02B 6/4472 174/68.1 |
| 8,882,514 | B2 * | 11/2014 | Enge | H01R 9/032 439/676 |
| 8,910,912 | B2 * | 12/2014 | Child | F16L 3/2235 248/68.1 |
| 8,926,339 | B2 | 1/2015 | Houtz | |
| 9,088,119 | B2 | 7/2015 | Baker | |
| 2004/0048506 | A1 | 3/2004 | Chung et al. | |
| 2004/0115997 | A1 | 6/2004 | Scherer | |
| 2005/0098688 | A1 * | 5/2005 | Miarka | F16L 3/223 248/68.1 |
| 2005/0224585 | A1 * | 10/2005 | Durrant | G02B 6/3807 235/492 |
| 2005/0271328 | A1 * | 12/2005 | Ohtsu | G02B 6/3829 385/59 |
| 2006/0148279 | A1 * | 7/2006 | German | H01R 13/465 439/49 |
| 2006/0189180 | A1 | 8/2006 | Lang | |
| 2007/0111598 | A1 | 5/2007 | Quilici | |
| 2007/0232132 | A1 | 10/2007 | Ling | |
| 2010/0062627 | A1 * | 3/2010 | Ambo | H01R 4/185 439/189 |
| 2010/0065327 | A1 * | 3/2010 | Lin | H01R 9/038 174/88 C |
| 2010/0130063 | A1 | 5/2010 | Lang et al. | |
| 2011/0034082 | A1 | 2/2011 | Zhu | |
| 2011/0165785 | A1 * | 7/2011 | Lindner | A61N 1/05 439/271 |
| 2011/0168423 | A1 * | 7/2011 | Hagi | H01R 4/726 174/34 |
| 2011/0179728 | A1 * | 7/2011 | Cerny | E01C 5/001 52/177 |
| 2011/0237112 | A1 | 9/2011 | Wu | |
| 2011/0300735 | A1 | 12/2011 | Wu | |
| 2012/0129382 | A1 | 5/2012 | Regnier | |
| 2012/0251064 | A1 * | 10/2012 | Crain | G02B 6/3879 385/135 |
| 2013/0005173 | A1 | 1/2013 | Reed et al. | |
| 2013/0183846 | A1 | 7/2013 | Kappla et al. | |
| 2013/0231011 | A1 | 9/2013 | Sytsma | |
| 2014/0038447 | A1 | 2/2014 | Brown | |
| 2014/0041937 | A1 | 2/2014 | Lloyd et al. | |
| 2014/0205243 | A1 | 7/2014 | Baker | |
| 2014/0363171 | A1 | 12/2014 | Tang et al. | |
| 2015/0244109 | A1 | 8/2015 | Byczkiewicz et al. | |

FOREIGN PATENT DOCUMENTS

| | | |
|---|---|---|
| JP | 2007317434 | 12/2007 |
| JP | 2009076375 | 4/2009 |
| KR | 1020100068002 | 6/2010 |
| TW | I267238 | 11/2006 |
| TW | M430018 | 5/2012 |
| WO | WO-2014043426 | 3/2014 |

OTHER PUBLICATIONS

"8 Channel Dula Multi-lane Sata2 Enclosure Device Bracket Scsi Opening," Retrieved from Internet Sep. 15, 2014, http://www.satacable.com/8-channel-dula-multi-lane-sata2-enclosure-device-bracket-scsi-opening.html.

"LC Right Angle Clip" Feb. 22, 2013, <http://www.senko.com/fiber/pdf_brochure/FeaturesBrochure_2013-v5.pdf >.

(56) References Cited

OTHER PUBLICATIONS

Dennis Martin, "Demartek Storage Networking Interface Comparison," May 9, 2014, http://www.demartek.com/Demartek_Interface_Comparison.html.
Neer, et al.; "Advanced SAS Connections Converge at 3.0," Retrieved form Internet Sep. 15, 2014; 5 pages; http://www.serialstoragewire.net/Articles/2009_12/molex.html.
PCT/ISA/KR, International Search Report and Written Opinion, dated Nov. 11, 2015, PCT/US2015/016283, 9 pps.
PCT/ISA/KR, International Search Report and Written Opinion, dated Jun. 19, 2015, PCT/US2014/057858, 12 pps.
PCT/ISA/KR, International Search Report and Written Opinion, dated Nov. 20, 2015, PCT/US2015/017964, 10 pps.
Fiberstore, "QSFP+ in the 40 Gigabit Ethernet Fiber Optic Media Systems" available online at <http://www.fiber-optic-equipment.com/tag/qsfp-cables>, Jun. 30, 2014, 6 pages.

* cited by examiner

CABLE ASSEMBLY WITH CONJOINED ONE-LANE CABLE ASSEMBLIES

BACKGROUND

High-radix network switch modules may support a high number of connectors on their faceplates. Network port standards allow 1-lane and wider ports (e.g., 12-lane for CXP), and wider ports use larger connectors and thus fewer connectors on the faceplate. Different applications use different port bandwidth. Traditionally, either 1-lane (e.g., Small Form-Factor Pluggable (SFP)) or 4-lane (e.g., Quad Small Form-Factor Pluggable (QSFP)) ports predominate the Ethernet industry. As the bandwidth available per lane has reached 10 Gbps and above, however, not every system can take advantage of QSFP 4-lane ports.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

Traditional network ports have a fixed number of lanes. A lane includes a pair of transmit differential signals and a pair of receive differential signals for network communications. For example, there are multiple Ethernet standard protocols where 1 GbE and 10 GbE can be 1-lane protocols, 10 GbE, 40 GbE, and 100 GbE may be 4-lane protocols, and 100 GbE may be a 10-lane protocol. Accordingly, network chips, connectors, and cables have been defined to provide a fixed number of lanes for a network port. Ethernet standards have been emerging where a port of a network chip may be configured to be a 4-lane port (e.g., 4×25 G for 100 GbE), a 2-lane port (e.g., 2×25 G for 50 GbE), or a 1-lane port (e.g., 1×25 G for 25 GbE).

Existing connectors and cables for network ports are defined for a fixed number of lanes. This is not a problem for 1-lane ports or for multi-lane ports as long as the application calls for fixed lane-count ports (e.g., QSFP for a 4-lane port). When a multi-lane port of a chip in a network switch system, however, needs to be connected by network interface chips in computer systems having a varying number of lanes (e.g., 1-lane, 2-lane, 4-lane), the fixed lane-count connectors and cables will force certain lanes on a network chip port to be unusable, thus resulting in wasted or stranded lanes. A network chip may be a switch ASIC, a NIC (network interface controller) chip, an electrical transceiver chip (e.g., retimer, redriver), an optical transceiver chip, or a combination of these chips interconnected.

To minimize product models, many switches include QSFP ports. Using only one lane or two lanes out of the available four lanes, however, is wasteful. Therefore, users may buy switches with QSFP 4-lane ports for future proofing, and use break-out cables to fan-out four SFP 1-lane ports for every QSFP port. This approach is expensive and can introduce signal integrity issues. A fan-out cable may also be difficult to provide appropriate cable lengths, resulting installations with coiled up cables. The cable fan-out joint as well as cable coils can significantly introduce cable bulk that can impede air flow behind datacenter equipment racks.

Accordingly, this disclosure describes cable connectors to allow receptacles on the system side to accept a plurality of 1-lane cable assemblies so that switch manufacturers can design one system with one set of connectors on each faceplate that will allow varying lane-count cable assemblies by conjoining the plurality of 1-lane cable assemblies. Switch port signals may be connected to specific receptacle connector bays in a way that all the lanes of the network chips can be used. Therefore, the disclosure provides for high connector density and lower solution costs by enabling simple and compact connector designs. As will be further described, cable connectors of 1-lane cable assemblies may be conjoined to form multi-lane connectors and/or cable assemblies (e.g., 2-lane or 4-lane). Similarly, when it is desirable, the conjoined cable assemblies may be easily disjoined to be used as separate 1-lane cable assemblies.

Each network port connection is provided on a switch in the form of a receptacle for an external cable to be connected. Although the receptacles may be implemented on the front or the rear side of a switch, this disclosure uses the term "faceplate" to generically describe where the receptacles are located for cables to be installed.

Figure 1A:
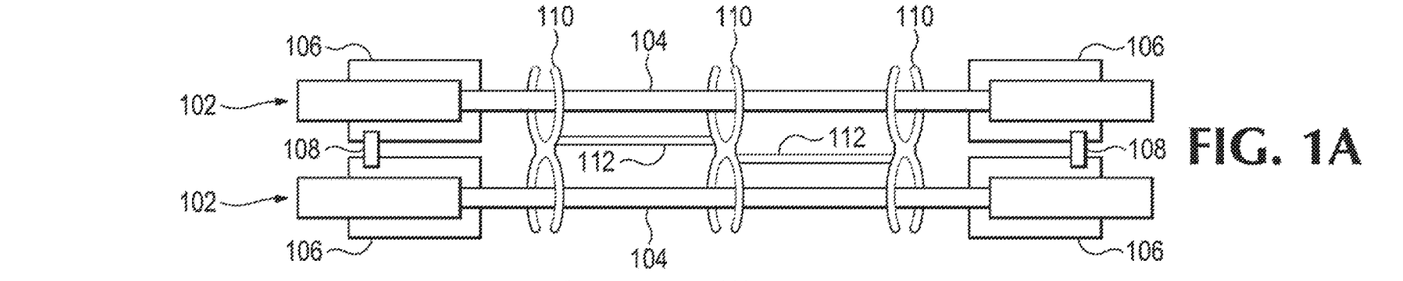
FIGS. 1A-C illustrate examples of 1-lane cable assemblies conjoined to form different multi-lane cable assemblies.
Figure 1B:
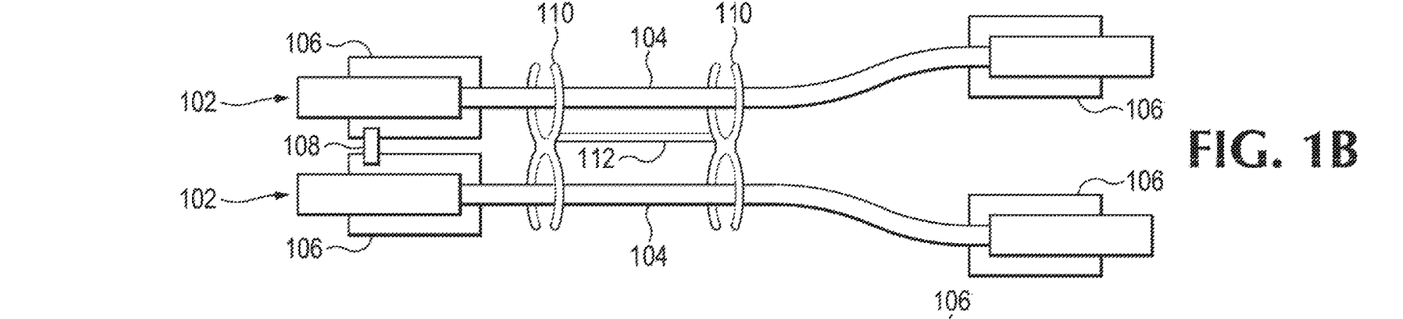
Figure 1C:
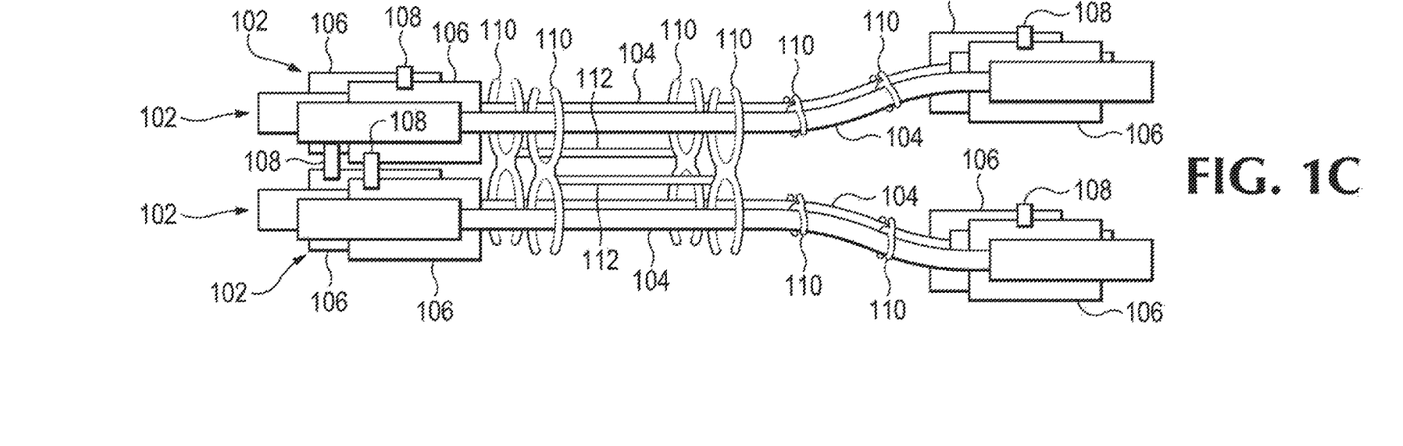

Referring to the figures, FIGS. 1A-C illustrate examples of 1-lane cable assemblies 102 conjoined to form different multi-lane cable assemblies. As an example, each 1-lane cable assembly 102 includes a cable 104 and a cable connector 106 attached to at least one end of the cable 104. A multi-lane cable assembly may include connector joining devices 108 to conjoin multiple cable connectors 106. As will be further described, the connector joining devices 108 may correspond to interlocking geometries of a cable connector 106 to conjoin with interlocking geometries of cable connectors of other 1-lane cable assemblies. In addition to conjoining cable connectors 106 of 1-lane cable assemblies 102, the multi-lane cable assembly may include cable joining devices 110 to conjoin multiple cables 104. As an example, when it is desirable to use the 1-lane cable assemblies 102 individually, the conjoined connectors 106 and conjoined cables 104 may be disjoined, as will be further described.

Referring to FIG. 1A, two 1-lane cable assemblies 102 are conjoined to form a 2-lane cable assembly, according to an example. As illustrated, the cable connectors 106 on either end are conjoined via connector joining devices 108. In addition, the cables 104 are conjoined via the cable joining devices 110 (e.g., 2-way clusters for conjoining two cables 104). The number of cable joining devices 110 used for conjoining the cables 104 may vary. For example, although three cable joining devices 110 are illustrated, more or fewer cable joining devices 110 may be used. As an example, each cable joining device 110 may be connected with removable cable joint spacer devices 112, in order to keep the cable joining devices 110 at a chosen distance from each other. The cable joining devices 110 may be installed before or after the multi-lane cable assembly is built, as will be further described.

Referring to FIG. 1B, two 1-lane cable assemblies 102 are conjoined on one end of the cable assemblies 102, according to an example. The other end of the cable assemblies 102 has fan-out single cable ends, for example, to connect to different systems. Similarly, FIG. 10 illustrates four 1-lane cable assemblies 102 conjoined on one end, and fan-out cables on the other end. However, the end of the multi-lane cable assembly with the fan-out cables also have conjoined cables 104 and conjoined connectors 106, for example, to connect to different systems having 2-lane receptacles. As illustrated, the four 1-lane cable assemblies 102 may be conjoined on one end via pairs of 2-way clusters. However, a pair of 2-way clusters may be replaced by a 4-way cluster (not illustrated) in order to conjoin the four cables 104.

Figure 2A:
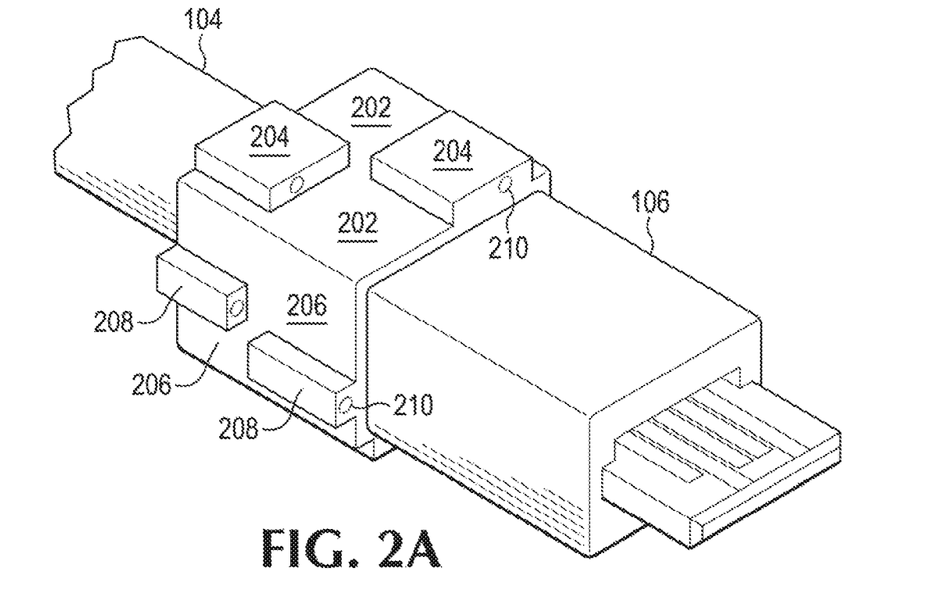
FIGS. 2A-C illustrate various isometric views of a cable connector of a 1-lane cable assembly, according to an example.
Figure 2B:
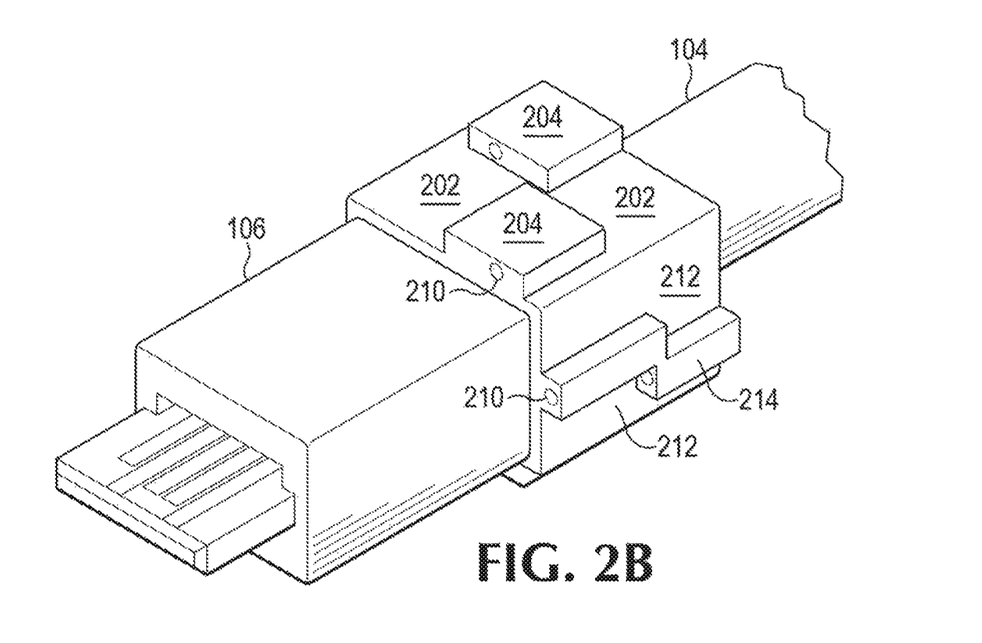
Figure 2C:
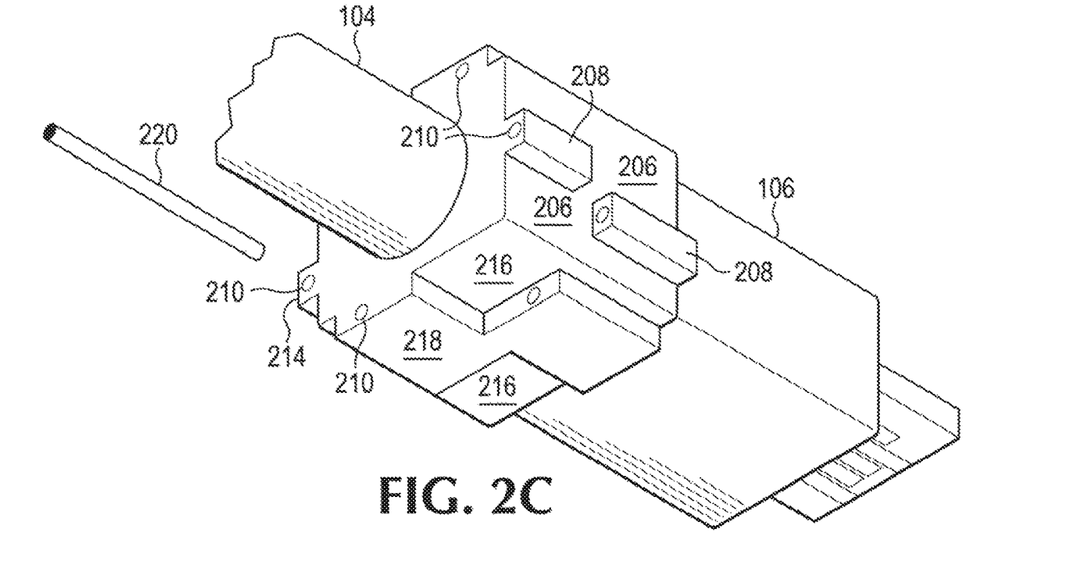

FIGS. 2A-C illustrate various isometric views of a cable connector 106 of a 1-lane cable assembly, according to an example. As mentioned above, the connector joining device, for conjoining cable connectors 106, may correspond to interlocking geometries. As an example, the interlocking geometries may be integrated on the shell or exterior of the cable connectors 106. As will be further described, the interlocking geometries may correspond to tabs and recesses on the shell of a cable connector 106. As an example, tabs of a first cable connector may mate with recesses of a second cable connector, and recesses of the first cable connector may mate with tabs of the second cable connector.

Referring to FIG. 2A, a top of the cable connector 106 may include tabs 204 and recesses 202, and a left side of the cable connector 106 may include tabs 208 and recesses 206. Referring to FIG. 2B, a right side of the cable connector may include tabs 214 and recesses 212. Finally, referring to FIG. 2C, the bottom of the cable connector may include tabs 218 and recesses 216. As an example, interlocking geometries on the bottom of a first cable connector may couple with a reverse geometry at the top of second cable connector. More specifically, tabs 218 and recesses 216 on the bottom of the first cable connector may couple with the recesses 202 and tabs 204 on the top of the second cable connector, respectively.

Similarly, interlocking geometries on the left side of the first cable connector may couple with a reverse geometry on the right side of second cable connector. More specifically, tabs 208 and recesses 206 on the left side of the first cable connector may couple with recesses 212 and tabs 214 on the right side of the second cable connector, respectively. The arrangement of the recesses and tabs on the connector cable 106 may vary, and are not limited to what is illustrated. Upon using the interlocking geometries to conjoin or couple cable connectors of 1-lane cable assemblies, pins 220 may be insertable through the holes 210 of the interlocking geometries (e.g., the tabs), in order to secure the conjoined 1-lane cable assemblies to each other, as illustrated in the following figures.

Figure 3:
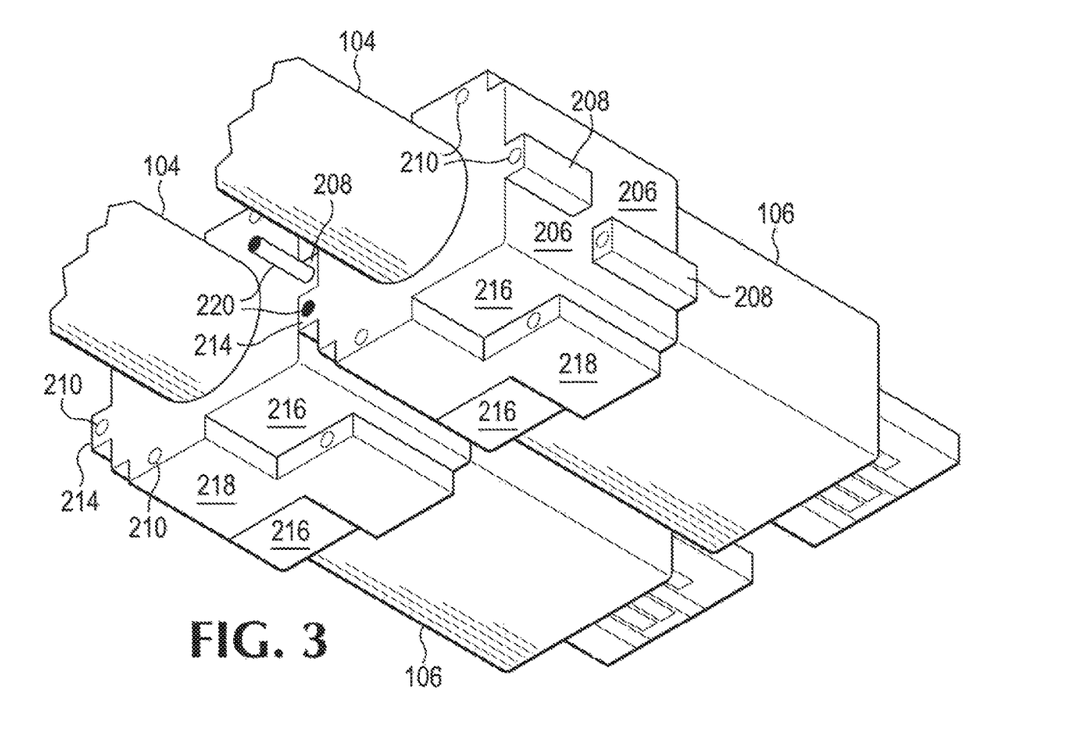
FIG. 3 illustrates cable connectors of two 1-lane cable assemblies conjoined side-by-side to form a 2-lane cable assembly, according to an example.

FIG. 3 illustrates cable connectors 106 of two 1-lane cable assemblies conjoined side-by-side to form a 2-lane cable assembly, according to an example. As illustrated, tabs 208 and recesses 206 on the left side of the first cable connector may couple with recesses 212 and tabs 214 on the right side of the second cable connector, respectively. Upon using the interlocking geometries to conjoin side-by-side the cable connectors 106 of the two 1-lane cable assemblies, pins 220 may be insertable through the interlocking geometries, in order to secure the conjoined 1-lane cable assemblies to each other. As an example, the pins 220 may be inserted through holes 210 located through the tabs of the cable connectors 106. With regards to the partially installed pin 220 that is illustrated, it may be inserted through tab 208 of the first cable connector and the upper portion of tab 214 of the second cable connector (not illustrated) that aligns with tab 208. As an example, when it is desirable to use the 1-lane cable assemblies 102 individually, the conjoined connectors 106 may be disjoined by removing the pins 220 that secure the connectors 106 together.

Figure 4A:
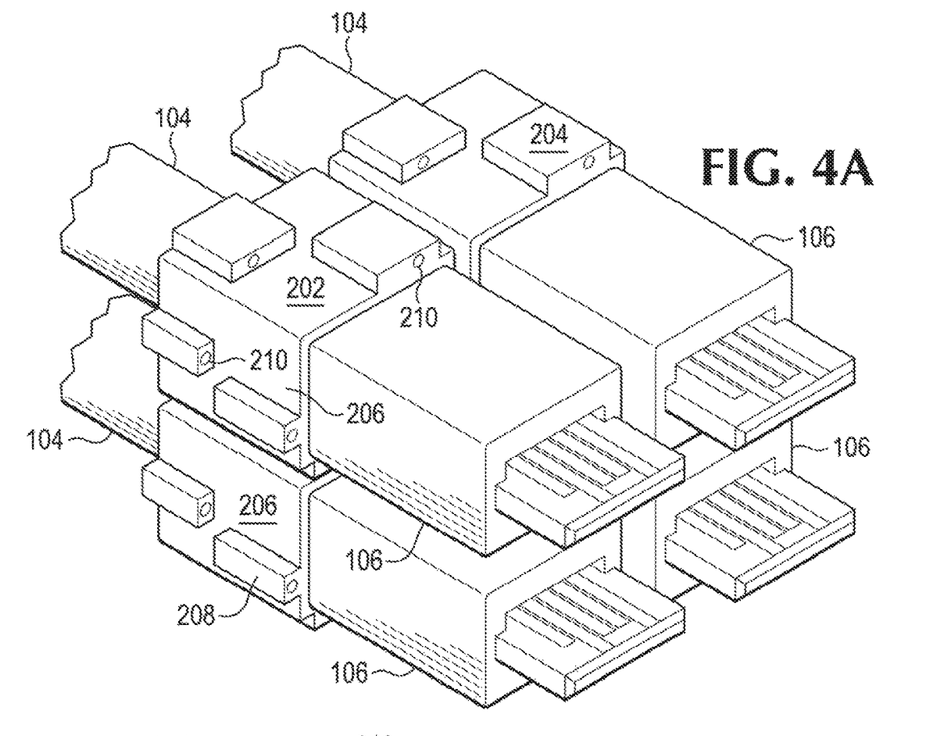
FIGS. 4A-B illustrate cable connectors of four 1-lane cable assemblies conjoined to form a 4-lane cable assembly, according to an example.
Figure 4B:
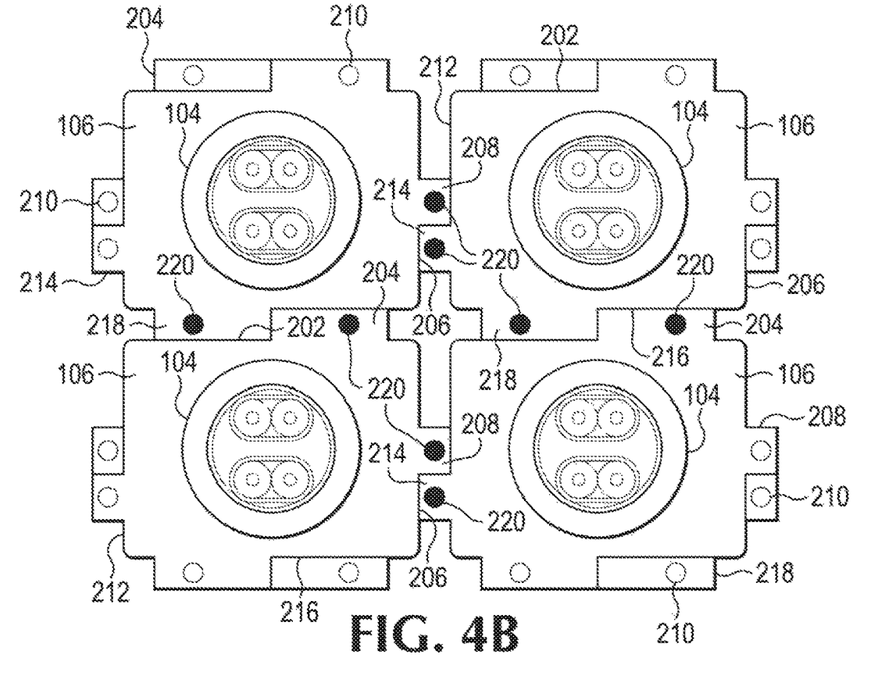

FIGS. 4A-B illustrate cable connectors 106 of four 1-lane cable assemblies conjoined to form a 4-lane cable assembly, according to an example. As illustrated, tabs 218 and recesses 216 on the bottom of the top two cable connectors may couple with the recesses 202 and tabs 204 on the top of the bottom two cable connectors, respectively. Similarly, tabs 208 and recesses 206 of the left two cable connectors may couple with recesses 212 and tabs 214 of the right two cable connectors, respectively. Upon using the interlocking geometries to conjoin the cable connectors 106 of the four 1-lane cable assemblies, eight pins 220 may be insertable through the holes 210 of the interlocking geometries, in order to secure the four conjoined 1-lane cable assemblies to each other. Although eight pins 220 are utilized for securing the 1-lane cable assemblies together, any number of pins may be utilized. Although FIGS. 3 and 4A-B illustrate the use of 1-lane cable assemblies to form a 2-lane cable assembly and a 4-lane cable assembly, respectively, other multi-line cables may be formed by the 1-lane cable assemblies (e.g., an 8-line cable assembly).

Figures 5, 6:
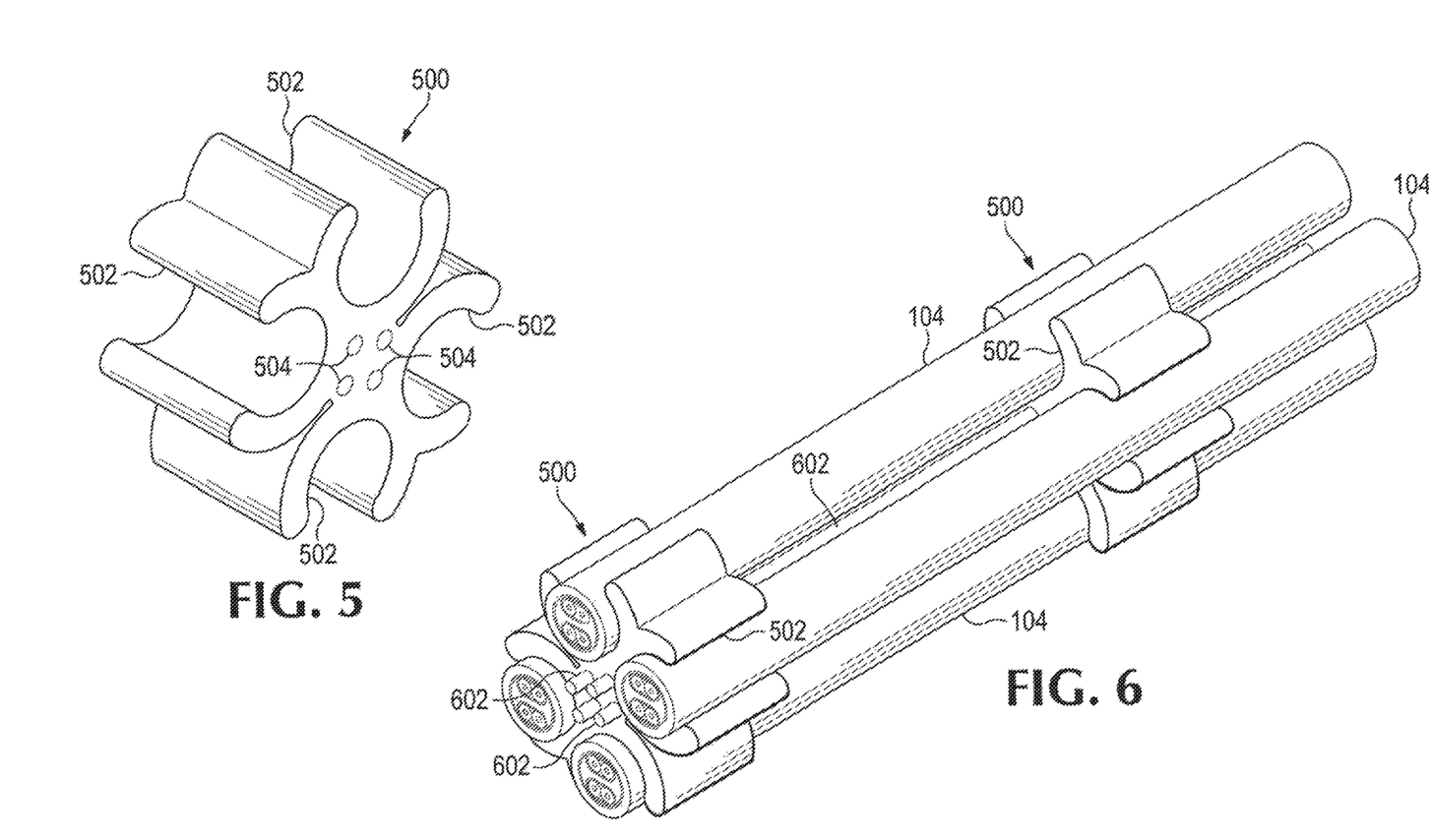
FIG. 5 illustrates an example cable joining device for conjoining cables of 1-lane cable assemblies.
FIG. 6 illustrates four cables from 1-lane cable assemblies conjoined by a number of c-clip clusters, according to an example.

In addition to conjoining cable connectors of 1-lane cable assemblies, for example, via the interlocking geometries and pins described above, the multi-lane cable assembly may include cable joining devices to conjoin the multiple cables of the multi-lane cable assembly (e.g., see cable joining devices 110 in FIGS. 1A-C). FIG. 5 illustrates an example cable joining device 500 for conjoining cables of 1-lane cable assemblies. More specifically, FIG. 5 illustrates a 4-way circlip (c-clip) cluster 500 as an example of a cable joining device to conjoin four cables, where each of the four c-shaped clips 502 may hold a cable. Although FIG. 5 illustrates a cable joining device for conjoining four cables, the cable joining device may be configured for conjoining any number of cables. For example, a 2-way c-clip cluster (not illustrated) may have two c-shaped clips for conjoining two cables.

The materials used for forming the cable joining device may vary. For example, the 4-way c-clip cluster 500 may be made of plastic, rubber, or metal. In addition, the c-shaped clips 502 may have various sizes for accommodating different diameters of cables. The cluster 500 illustrated may be appropriate for temporarily conjoining cables, since cables may be easily snapped in and out from the c-shaped clips 502 (e.g., when it is desirable to disjoin the cables 104 from the cluster 500). However, the c-shaped clips 502 may be enclosed (e.g., o-clip) for applications that require permanently conjoined cables. In addition to the c-shaped clips 502, the cluster 500 may include a number of holes 504 to retain spacer devices for keeping multiple clusters 500 a chosen or fixed distance from each other. Examples of various spacer devices are illustrated in FIGS. 7A-C.

FIG. 6 illustrates four cables 104 from 1-lane cable assemblies conjoined by a number of c-clip clusters 500, according to an example. Although two c-clip clusters 500 are illustrated, any number of clusters 500 may be utilized for conjoining the cables 104. For keeping the clusters 500 a fixed distance from each other, spacer devices, such as the spacer rods 602 illustrated, may be routed through holes 504 in order to maintain the fixed distance. However, the use of spacer devices are not required for conjoining the cables 104. As a number of clusters 500 may be used for conjoining the cables 104, the clusters may be cascaded where, for example, a first set of spacer devices connect a first and second cluster 500, and a second set of spacer devices connect the second and a third cluster 500. The clusters 500 may continue to be cascaded, based on the number of clusters 500 used. As an example, a label base layer may be installed across at least two clusters 500 (not illustrated), providing a large area for labels to be affixed easily.

Based on whether cable connectors (e.g., cable connector 106) are fixed on either end of the cables 104, the cables 104 may be snapped onto a corresponding circlip (c-shaped clip 502) of the cluster, or the cluster 500 may be slipped onto the cables 104. For example, if there are cable connectors 106 on both ends of the cables 104, the clusters 500 may be placed between or among the cables 104, and the cables may snap on the circlips 502. Alternatively, if there are no cable connectors 106 on at least one end of the cables 104, the clusters may be slipped onto the cables 104.

Figure 7A:
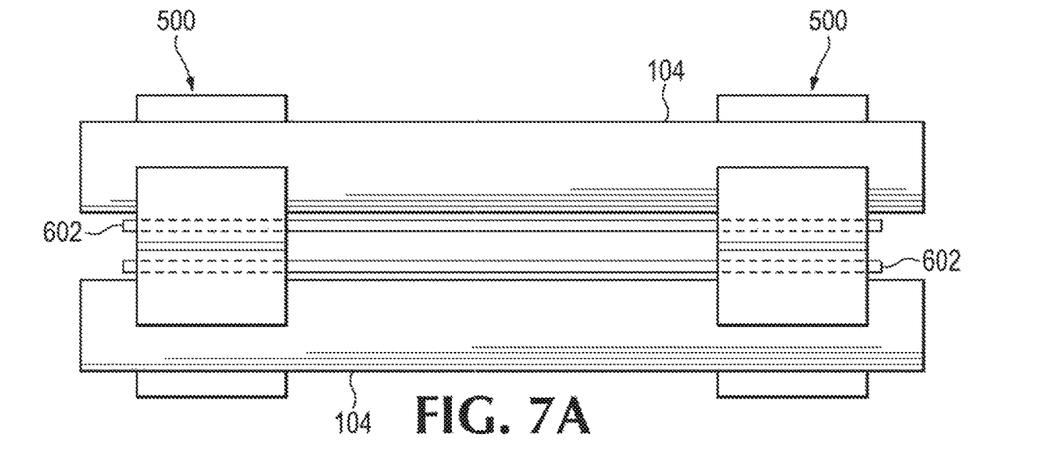
FIGS. 7A-C illustrate example spacer devices for keeping cable joining devices a fixed distance from each other.
Figure 7B:
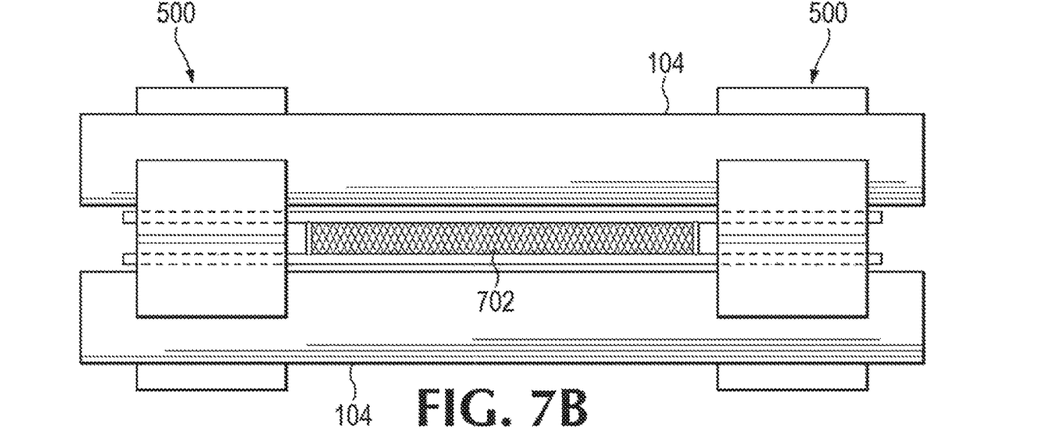
Figure 7C:
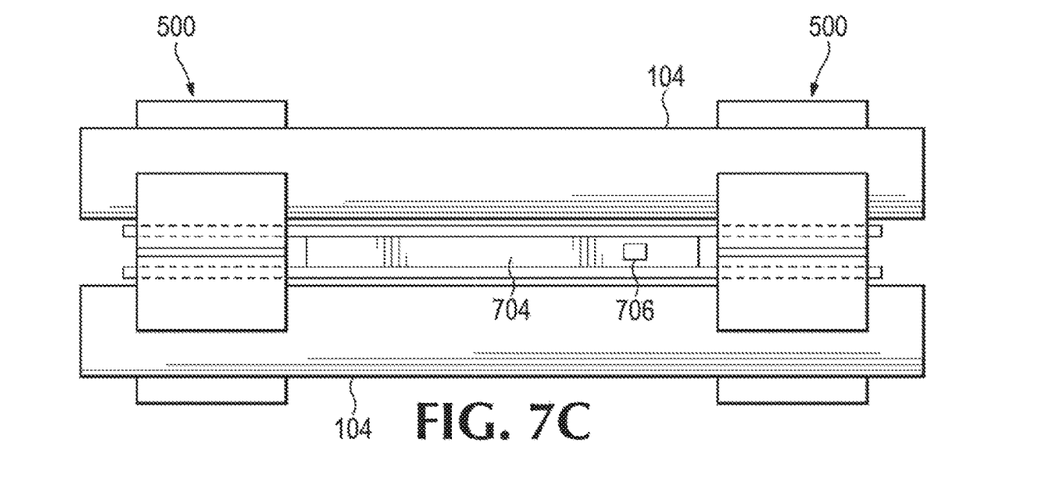

FIGS. 7A-C illustrate example spacer devices for keeping cable joining devices, such as the c-clip clusters 500, a fixed distance from each other. FIG. 7A illustrates spacer rods 602, as also illustrated in FIG. 6. FIG. 7B illustrates a spacer device with a spacer mesh/sheet 702. As an example, a stiffness of the spacer mesh/sheet 702 can be selected to manage relative orientations of multiple cables 104 when they are conjoined. FIG. 7C illustrates a spacer device with a spacer plate 704. As an example, the space plate 704 may securely hold devices, such as a radio-frequency identification (RFID) tag 706, within the conjoined cables 104. The RFID tag 706, as an example, may consist of cable configuration details appropriate to the cable assembly.

Each network port connection is provided on a network switch module in the form of a receptacle for an external cable assembly to be connected. As an example, receptacles on the system side may be configured to accept the multi-lane cable assemblies described above, which include the plurality of conjoined 1-lane cable assemblies. The multiple receptacles to accept the plurality of conjoined 1-lane cable assemblies may be referred to as a single receptacle. As an example, the multi-lane cable assembly may include latching features for coupling the multi-lane cable assembly to the receptacle.

Figure 8A:
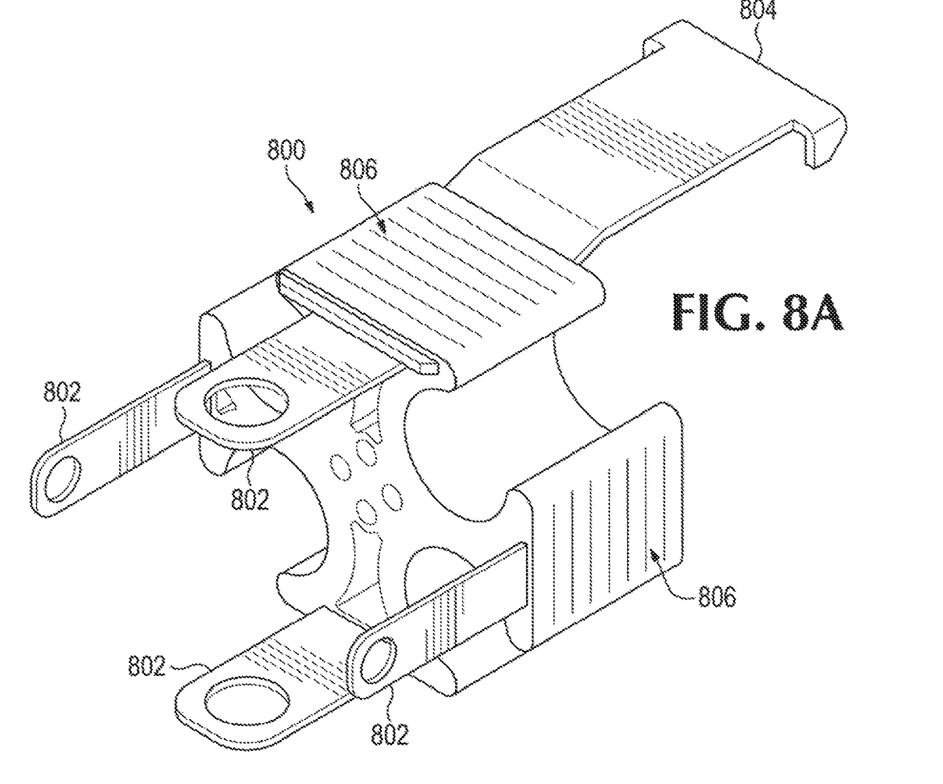
FIGS. 8A-B illustrate isometric views of a c-clip cluster including an integrated latching feature for coupling a multi-lane cable assembly to a receptacle, according to an example.
Figure 8B:
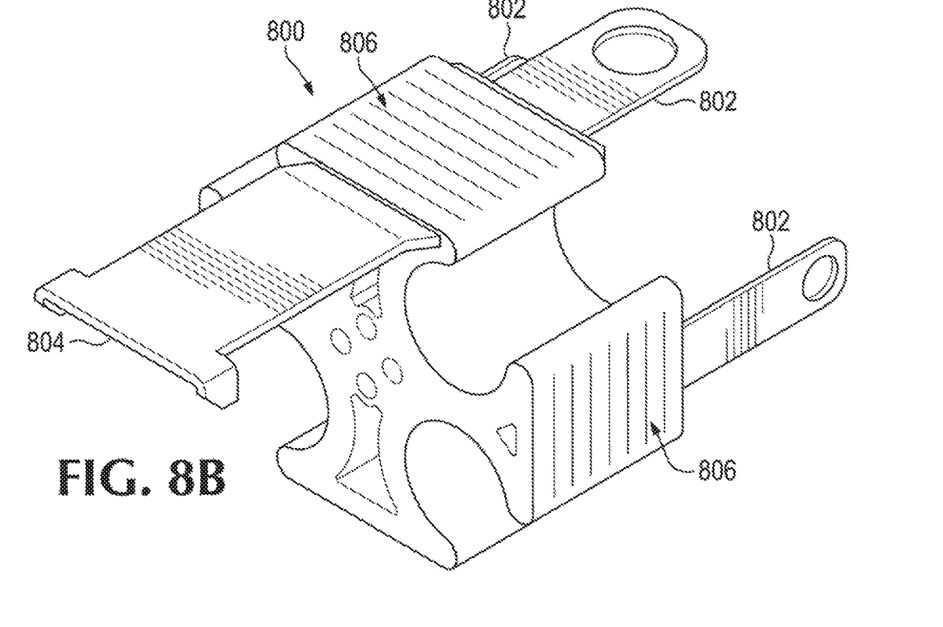
Figure 9A:
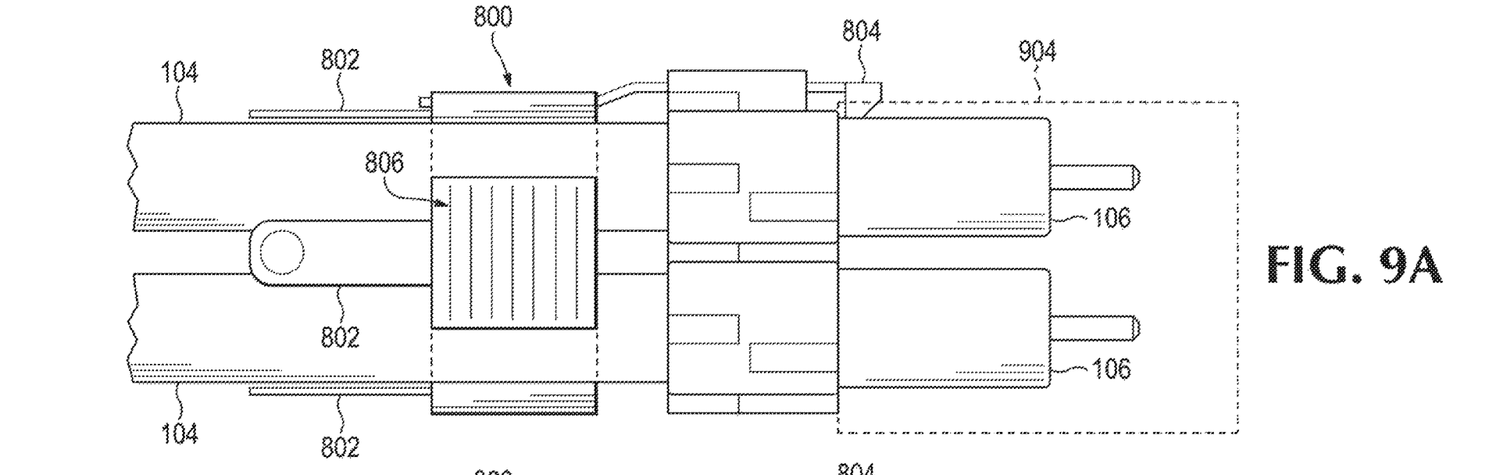
FIG. 9A-B illustrate a method for disengaging a multi-lane cable assembly from a receptacle 904, according to an example.
Figure 9B:
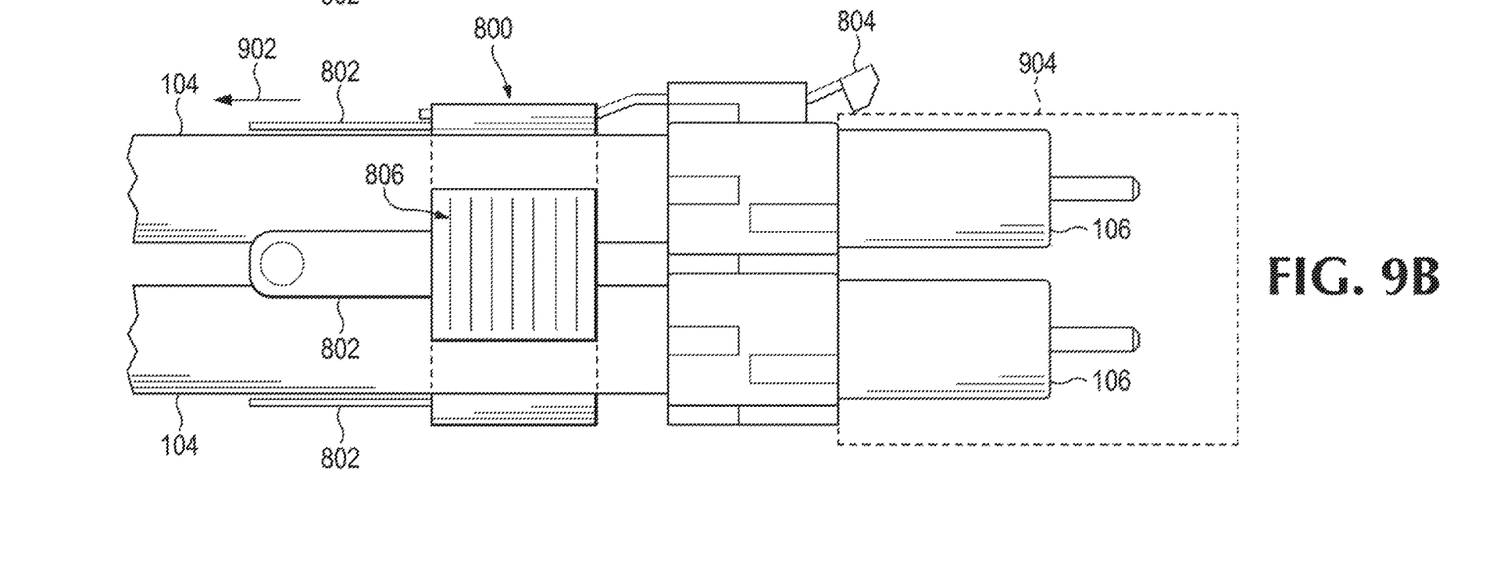

FIGS. 8A-B illustrate isometric views of a c-clip cluster 800 including an integrated latching feature 804 for coupling a multi-lane cable assembly to a receptacle, according to an example. As an example, as multiple cable joining devices may be used, the c-clip cluster 800 with the integrated latching feature 804 may be coupled to an end of the cables of the multi-lane cable assembly, adjacent to cable connectors 106 for making connection with the receptacle, as illustrated in FIGS. 9A-B. For removing or disengaging the multi-lane cable assembly from the receptacle, the c-clip cluster 800 may include pull-tabs 802 (e.g., one or more) to actuate the latching features to disengage from the receptacle, as will be further described in FIGS. 9A-B.

FIGS. 9A-B illustrate a method for disengaging a multi-lane cable assembly from a receptacle 904, according to an example. Referring to FIG. 9A, the latching feature 804 may be engaged with the receptacle 904, as illustrated, in order to maintain a secure connection. In addition to the latching feature 804, each cable connector 106 of the plurality of 1-lane cable assemblies may include separate latching features (not illustrated) for coupling to the receptacle 904. Referring to FIG. 9B, when a pull-tab 802 is pulled (indicated by arrow 902), the latching feature 804 may be actuated to disengage from the receptacle 904, allowing for the secure connection to be terminated. As an example, outer surfaces of the c-clip cluster 800 may be textured (indicated by 806) for ease of operation to actuate the latching feature 804, particularly when pull-tabs 802 may not be available. The c-clip cluster 800 may have enough tolerance in order to slide along the conjoined cables 104, so that the latching feature 804 can be actuated easily when the pull-tabs 802 or the c-clip cluster 800 itself is pulled back to unlatch the cable assembly from the receptacle 904.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A composite single multi-lane cable assembly constructed from multiple interconnected cable connectors from each instance of a 1-lane cable, each individual 1-lane cable having a connector with an external geometry to interlock with at least one adjacent cable connector, the single conjoined multi-lane cable assembly comprising:
   a first 1-lane cable assembly comprising:
      a first cable connector attached to at least one end of a first cable, comprising:
         a first set of tabs and recesses on a first portion of the first cable connector, and
         a second set of tabs and recesses on a second portion of the first cable connector;
   a second 1-lane cable assembly comprising:
      a second cable connector attached to at least one end of a second cable, comprising:
         a third set of tabs and recesses on a first portion of the second cable connector, and
         a fourth set of tabs and recesses on a second portion of the second cable connector,
   wherein the first set of tabs and recesses interlocks with the third set of tabs and recesses and the second set of tabs and recesses interlocks with the fourth set of tabs and recesses to form the composite single multi-lane cable connector from the first cable connector and the second cable connector;

a first pin insertable through aligned holes of the first set of tabs and recesses and third set of tabs and recesses, wherein the first pin prevents separation of the first set and third set of tabs and recesses;

a second pin insertable through aligned holes of the second set of tabs and recesses and the fourth set of tabs and recesses, wherein the second pin prevents separation of the second set and fourth set of tabs and recesses, wherein upon insertion of the first pin and the second pin, the single aligned conjoined multi-lane cable assembly presents the composite single multi-lane cable connector that securely provides for the first cable connector and the second cable connector to function as a conjoined unit; and latching features to couple the composite single multi-lane cable connector to a receptacle.

2. The composite single multi-lane cable assembly of claim 1, wherein tabs of the first cable connector are to mate with recesses of the second cable connector, and wherein recesses of the first cable connector are to mate with tabs of the second cable connector.

3. The composite single multi-lane cable assembly of claim 2, wherein when the first cable connector is conjoined with the second cable connector, the first and second pins are inserted through the tabs of the first and second cable connectors.

4. The composite single multi-lane cable assembly of claim 1, comprising cable joining devices to conjoin the cables of the 1-lane cable assemblies.

5. The composite single multi-lane cable assembly of claim 4, wherein the cable joining devices comprise a cluster of circlips, wherein each cable of a 1-lane cable assembly is to snap onto a corresponding circlip, or wherein the cluster of circlips are to slip onto cables from the plurality of 1-lane cable assemblies.

6. The composite single multi-lane cable assembly of claim 4, comprising spacer devices to keep the cable joining devices a fixed distance from each other.

7. The composite single multi-lane cable assembly of claim 6, wherein the spacer devices comprise a radio-frequency identification (RFID) tag.

8. The composite single multi-lane cable assembly of claim 4, wherein the latching features are integrated with one of the cable joining devices, and wherein the cable joining device with the integrated latching features comprises pull-tabs to actuate the latching features when the composite single multi-lane cable connector is to disengage from the receptacle.

9. The composite single multi-lane cable assembly of claim 1, wherein the composite single multi-lane cable connector couples to the receptacle which comprises a plurality of bays, each bay supporting 1-lane for differential transmit signals and differential receive signals, and wherein coupling the composite single multi-lane cable connector to the receptacle connects the plurality of 1-lane cable assemblies to provide a plurality of 1-lane ports.

10. A conjoined multi-lane cable assembly, the conjoined multi-lane cable assembly comprising:

a plurality of 1-lane cable assemblies, each having an end cable connector that when connected together to each other, form a conjoined multi-lane cable assembly connector as a composite connector, the composite connector formed by interconnected instances of the end cable connectors;

a first individual cable connector attached to an end of a first cable assembly of the plurality of 1-lane cable assemblies;

a second individual cable connector attached to a second cable of the plurality of 1-lane cable assemblies, the second individual cable connector aligned with the first individual cable connector;

a first pin insertable through a first tab of the first individual cable connector and through a first complementary tab of the second individual cable connector to prevent separation of the first tab and the first complementary tab and to form the composite connector including the first individual cable connector and the second individual cable connector;

a second pin insertable through a second tab of the first individual cable connector and through a second complementary tab of the second individual cable connector to prevent separation of the second tab and the second complementary tab and to secure the composite connector; and latching features to couple the composite connector to a receptacle.

11. The conjoined multi-lane cable assembly of claim 10, comprising cable joining devices to conjoin the cables of the 1-lane cable assemblies.

12. The conjoined multi-lane cable assembly of claim 11, wherein the latching features are integrated with one of the cable joining devices, and wherein the cable joining device with the integrated latching features comprises pull-tabs to actuate the latching features when the composite connector is to disengage from the receptacle.

13. A cable assembly having a single composite connector formed from multiple 1-lane cable connectors, the cable assembly comprising:

a plurality of 1-lane cable assemblies, each 1-lane cable assembly comprising:
a cable; and
a cable connector attached to at least one end of the cable, wherein each cable connector of a 1-lane cable assembly comprises a plurality of interlocking geometries to conjoin with interlocking geometries of cable connectors of other directly adjacent 1-lane cable assemblies;

a plurality of pins, each insertable through one of the plurality of interlocking geometries and through a complementary one interlocking geometry of a directly adjacent cable connector of the plurality of 1-lane cable assemblies, wherein the pins are to secure adjacent connectors of the conjoined 1-lane cable assemblies to each other by preventing separation of the respective interlocking geometry of each cable connector from the complementary interlocking geometry of respective adjacent cable connectors of the adjacent 1-lane cable assembly, wherein conjoined cable connectors form the single composite cable connector that, after conjoining, provides multi-lane connectivity for the single composite cable connector;

latching features to couple the single composite cable connector to a receptacle; and cable joining devices to conjoin the cables of the 1-lane cable assemblies, wherein the latching features are integrated with one of the cable joining devices, and wherein the cable joining device with the integrated latching features comprises pull-tabs to actuate the latching features when the single composite cable connector is to disengage from the receptacle.

14. The cable assembly of claim 13, wherein the interlocking geometries of a cable connector comprises tabs and recesses, wherein tabs of respective cable connectors are to mate with recesses of a directly adjacent cable connector, and wherein recesses of the respective cable connectors are to mate with tabs of the directly adjacent cable connector.

15. The cable assembly of claim 14, wherein when a first cable connector is to conjoin with a second cable connector, the pins are to insert through the tabs of the first and second cable connectors.

16. The cable assembly of claim 11, comprising spacer devices to keep the cable joining devices a fixed distance from each other.

17. The cable assembly of claim 16, wherein the spacer devices comprise a radio-frequency identification (RFID) tag.

18. The cable assembly of claim 10, wherein the single composite connector couples to the receptacle which comprises a plurality of bays, each bay supporting 1-lane for differential transmit signals and differential receive signals, and wherein coupling the single composite connector to the receptacle connects the plurality of 1-lane cable assemblies to provide a plurality of 1-lane ports.

19. The cable assembly of claim 13, comprising spacer devices to keep the cable joining devices a fixed distance from each other.

20. The cable assembly of claim 19, wherein the spacer devices comprise a radio-frequency identification (RFID) tag.

\* \* \* \* \*